United States Patent [19]

Nygaard

[11] 4,099,225
[45] Jul. 4, 1978

[54] PROTECTIVE CIRCUIT FOR AN INVERTER

[75] Inventor: Nils Hansson Nygaard, Sonderborg, Denmark

[73] Assignee: Danfoss A/S, Nordborg, Denmark

[21] Appl. No.: 816,812

[22] Filed: Jul. 18, 1977

[30] Foreign Application Priority Data

Jul. 19, 1976 [DE] Fed. Rep. of Germany ....... 2632380

[51] Int. Cl.² ............................................. H02M 1/18
[52] U.S. Cl. ........................................ 363/56; 363/98; 363/132
[58] Field of Search ...................................... 363/55–58, 363/79, 80, 86, 89, 97, 98, 131, 132, 135–138

[56] References Cited

U.S. PATENT DOCUMENTS

| 3,427,526 | 2/1969 | Kernick | 363/56 X |
| 4,025,862 | 5/1977 | Gautheron | 363/86 X |
| 4,047,081 | 9/1977 | Liska | 363/97 X |
| 4,048,554 | 9/1977 | Stich | 363/98 |

*Primary Examiner*—William M. Shoop

[57] ABSTRACT

The invention relates to a protective circuit for an inverter having semiconductor control elements. The protective circuit includes a series regulator in its inlet branch and an intermediate filter circuit with the capacitor thereof extending between the inlet and outlet branches. First and second signal generators control the series regulator and the inverter. A control unit controls the first signal generator for normal operation. Parallel comparator units have monitoring inputs connected to different parts of the protective circuit for detecting abnormal conditions and outputs connected to both of the signal generators to effect the immediate turning off of the series regulator and the inverter when abnormal conditions are sensed. The inverter is off concurrently with the comparator output signal but a multivibrator switch having a predetermined period causes the series regulator to be off during that whole period independently of the comparator output signal. With the series regulator off and the inverter turned on, the filter capacitor is allowed to discharge through the inverter. If the abnormal condition does not disappear during this operational sequence, the sequence is repeated.

8 Claims, 4 Drawing Figures

PROTECTIVE CIRCUIT FOR AN INVERTER

The invention relates to a protective circuit for an inverter of which the semi-conductor control elements are operated by an inverter signal generator, comprising a controllable D.C. supply having a series regulator (vibrator) which is fed by a constant D.C. voltage and of which the semi-conductor control element is controlled by a regulator signal generator according to impulse width and/or frequency, and a filter condenser intermediate circuit, wherein at least one parameter, particularly the current, is monitored by means of a measuring location and a downstream comparator which, as long as the parameter is outside the permissible range, delivers an error signal which influences the regulator signal generator.

Inverters with excess current protective circuits are known. In one of the D.C. connecting lines, they comprise a current measuring resistor between the series regulator and the filter condenser. If the voltage tapped at this measuring location exceeds a limiting value set at a comparator, the voltage in the intermediate circuit is reduced with the aid of the series regulator to such an extent that a predetermined maximum current is not exceeded.

Even when this maximum current was still completely within the permissible load range of the semi-conductor contact elements of the inverter, it was found that these semi-conductor control elements were sometimes destroyed. This is particularly so if power transistors are used instead of controlled rectifiers as the control elements.

The invention is based on the problem of providing a protective circuit of the aforementioned kind offering a higher degree of protection against destruction of the semi-conductor control elements, particularly transistors.

This problem is solved according to the invention in that the error signal actuates a stop signal of given duration making the regulator signal generator substantially inoperative, that the inverter signal generator substantially blocks the semi-conductor control elements in response to the error signal, and that means for discharging the filter condenser are provided that are made effective within the duration of the stop signal.

The invention is based on the discovery that burning out of the semi-conductor control elements finds its cause in the discharge current of the filter condenser, this current flowing until the condenser voltage of the new voltage that is to be applied by reason of the detected excess current has adapted itself. Since the excess currents are often caused by short-circuits and transistors cannot withstand such short circuit currents until the voltage has been reduced, the inverter is now completely blocked on the occurrence of an error signal. In addition, the voltage supply is substantially interrupted by way of the series regulator. The filter condenser is now discharged. The duration of the stop signal can be readily selected to be so long that the condenser is fully discharged before the voltage supply is re-applied. When normal operation is re-established after the end of the stop signal, the voltage is sufficiently low to prevent damage to the semi-conductor control elements. If the current rises again because the short circuit has not been eliminated, a new error signal is immediately released and thus another stop signal so that no or hardly any load is applied to the semi-conductor control elements.

All these features are not only desirable when the error signal has occurred by reason of an excess current but also upon the existence of earth current, excess voltage and other errors.

Desirably, the stop signal is given by a monostable multivibrator which is actuated by the error signal.

The means for discharging the filter condenser may be disposed in a branch parallel to the inverter. However, a particularly simple embodiment is obtained if these means comprise the semi-conductor control elements and a control circuit, which momentarily eliminate blocking of the semi-conductor control elements. The time during which the semi-conductor control elements are again brought to their conductive state for normal functioning must of course be so short that the semi-conductor elements are not damaged. In this way the filter condenser is discharged in steps without the use of additional control elements.

In a preferred construction, blocking of the semi-conductor control elements takes place during the error signal and the control circuit comprises an excess current measuring location in the discharge circuit of the filter condenser and an excess current comparator with control hysteresis for giving an error signal. When the semi-conductor control elements again become conductive in the normal cycle at the end of the error signal, the filter condenser starts to discharge through the load circuit. By reason of the inductances that are present, the discharge current rises slowly. As soon as it exceeds a predetermined upper limiting value, the excess current comparator responds. An error signal is given and the semi-conductor control elements are blocked. The discharge current fades out. As soon as it is below a lower limiting value, the error signal disappears again and a new discharge cycle commences.

The excess current measuring location is desirably in series with an inductor and the series circuit is in shunt with a diode poled opposite to the normal current flow. With the aid of this inductor one can ensure a definite rise of the discharge current and, with due consideration to the diode, also a definite drop in the discharge current. In this way the operative and inoperative periods of the semi-conductor control elements can be adapted to the permissible load limits.

The excess current measuring location is with particular advantage disposed in one of the D.C. supply leads between the filter condenser and the inverter branches. In this way one detects not only an excess current during discharge of the filter condenser but also an excess current during normal operation. The error signal that then occurs brings about a corresponding drop in the regulated D.C. voltage.

On bridging the semi-conductor control elements with free running diodes, their connection should be between the filter condenser and excess current measuring location. In this way one does not detrimentally affect the function of the excess current measuring location and the diode bridging the inductor.

It is also favorable if on controlling the regulator signal with a D.C. regulator which adapts the current in one of the D.C. supply leads to a selectable reference parameter, a starting circuit is provided which allows the reference parameter to rise slowly to the selected value after termination of the stop signal. In this way one ensures that the voltage in the intermediate circuit rises only gradually after the error has presumably disappeared. If, for example, a short circuit should nevertheless still be in existence, this is detected by the excess current measuring location at a very low intermediate circuit voltage. During the subsequent repeated drop in the intermediate circuit voltage, the filter condenser need only be slightly discharged.

The starting circuit may comprise a starting condenser which is chargeable by the pulse-like stop signal by way of a diode and a charging resistor and dischargeable by way of a discharge resistor and is applied to an amplifier which can also be fed with a current measuring signal and a selectable reference signal.

In a preferred embodiment, there is an error signal line to which are connected the outputs of comparators which monitor the outputs of at least two different parameters and which give an error signal when the parameter monitored by them is outside the permissible range. There are various errors that can desirably be taken into account by lowering the voltage of the intermediate circuit.

One of these comparators can for example be an excess voltage comparator which gives an error signal when the supply voltage in front of the series regulator exceeds an upper limiting value. In factories having very large motors, switching on and off of the latter can give rise to very high voltage transients of for example 200 V in the mains, these lasting for several periods and being potentially dangerous for the semi-conductor control elements, particularly transistors. Actually, all that is important is to switch off the series regulator. However, a discharge of the filter condenser would be harmless and need not even take place if discharging is through the semi-conductor control elements of the inverter and the elements remain blocked in the presence of an error signal.

Similarly, an under-voltage comparator may also be provided which gives an error signal when the supply voltage in front of the series regulator is below a lower limiting value.

In this case a signal proportional to the supply voltage can be fed to the inverting input of an excess voltage differential amplifier and the non-inverting input of an under-voltage differential amplifier and a reference voltage may be applied to the other two inputs.

In a further development, an earth current comparator may be provided which gives an error signal when an earth current is detected by an earth current measuring location. Contact with earth generally leads to one of the two D.C. connecting leads being applied to earth potential. This gives rise to a corresponding increase in potential of the other D.C. connecting lead by reason of the voltage applied to the filter condenser. It is therefore desirable to reduce this voltage by discharging the filter condenser.

Advantageously, it is ensured that the earth contact measuring location comprises a summating transformer which is associated with the phase output lines of the inverter and which feeds a condenser and parallel discharge resistor by way of a rectifier circuit, and that the condenser voltage is applied to the input of the earth current comparator which has contact hysteresis. The continuance of the earth connection is thereby detected only in certain time intervals and discharging of the filter condenser can take place therebetween.

A favorable form for the comparators with control hysteresis is a differential amplifier with positive feedback.

Preferably, the semi-conductor control elements of the series regulator and of the inverter are transistors of which the base voltages can be applied by way of logic circuits and the stop signal influences at least one logic circuit in the regulator signal generator or the error signal influences at least one logic circuit in the inverter signal generator to suppress the base voltage.

The invention will now be described in more detail with reference to an example illustrated in the drawing, wherein.

Figure 1:
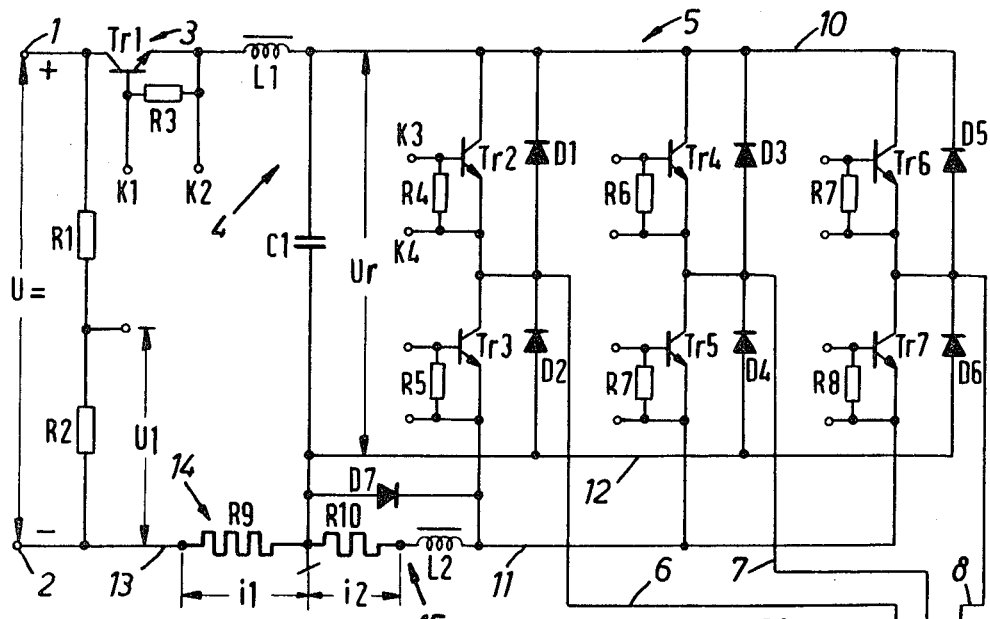
FIG. 1 is a simplified circuit diagram of an inverter with various measuring locations to be monitored.

Applied to terminals 1 and 2 there is a constant D.C. voltage which can for example be obtained from a three-phase voltage by a rectifier bridge with downstream filter condenser. A voltage divider consisting of the resistors R1 and R2 is applied to the terminals. A signal voltage $u_1$ proportional to the constant D.C. voltage $U_=$ can be tapped at the resistor R2.

A series regulator 3 consists essentially of a transistor Tr1 which is brought to the conductive state by the voltage drop at a resistor R3 when a regulating signal is applied to the terminals $k1$ and $k2$. This series regulator therefore operates as a vibrator controlled according to impulse width or frequency.

Downstream of it there is an intermediate circuit 4 comprising a filter condenser C1 and a smoothing choke L1. A regulatable smoothed D.C. voltage $U_r$ therefore occurs at the output of this intermediate circuit.

It is fed to a three-phase inverter 5 which comprises two series connected transistors Tr2, Tr3 or Tr4, Tr5 or Tr6, Tr7 in each of three branches. Each transistor is associated with a free-running diode D1, D2, D3, D4, D5 or D6, respectively. Control is again by way of the voltage drop at the associated resistors R4–R8 when an inverter control signal is applied to the terminals $k3$ and $k4$. These terminals $k3$ and $k4$ are identified only in the case of the transistor Tr2. Extending from the center point of each inverter branch there is a phase line 6, 7 or 8 leading to a consumer 9, particularly an A.C. motor. On the plus side, the transistors Tr2, Tr4 and Tr6 and the associated free-running diodes D1, D3, and D5 are applied to a common D.C. connecting lead 10. On the minus side, the transistors Tr3, Tr5 and Tr7 have a common D.C. connecting lead 11 whilst the associated diodes D2, D4 and D6 are combined to a separate lead 12.

In the line 13 common to these lines there is a measuring resistor R9 at which a current signal $i_1$ can be tapped as a voltage, this current corresponding to the total direct current. This measuring location is therefore referred to as the operating current measuring location 14.

A measuring resistor R10 and a choke L2 lie in series in the D.C. connecting line 11. This series circuit is bridged by a diode D7 which is poled opposite to the normal direction of the operating current. Only the current that previously flowed through the transistors will therefore flow through the measuring resistor R10. This measuring location is used as an excess current measuring location 15.

Associated with the three-phase lines 6, 7 and 8 there is a summation transformer T1 which is linked with all three windings. Its secondary winding is followed by a rectifier arrangement D8 which feeds a condenser C2 in parallel with a discharge resistor R11. The condenser voltage serves as earth contact current signal $i_3$. The entire arrangement is therefore an earth contact measuring location 16.

Figure 2:
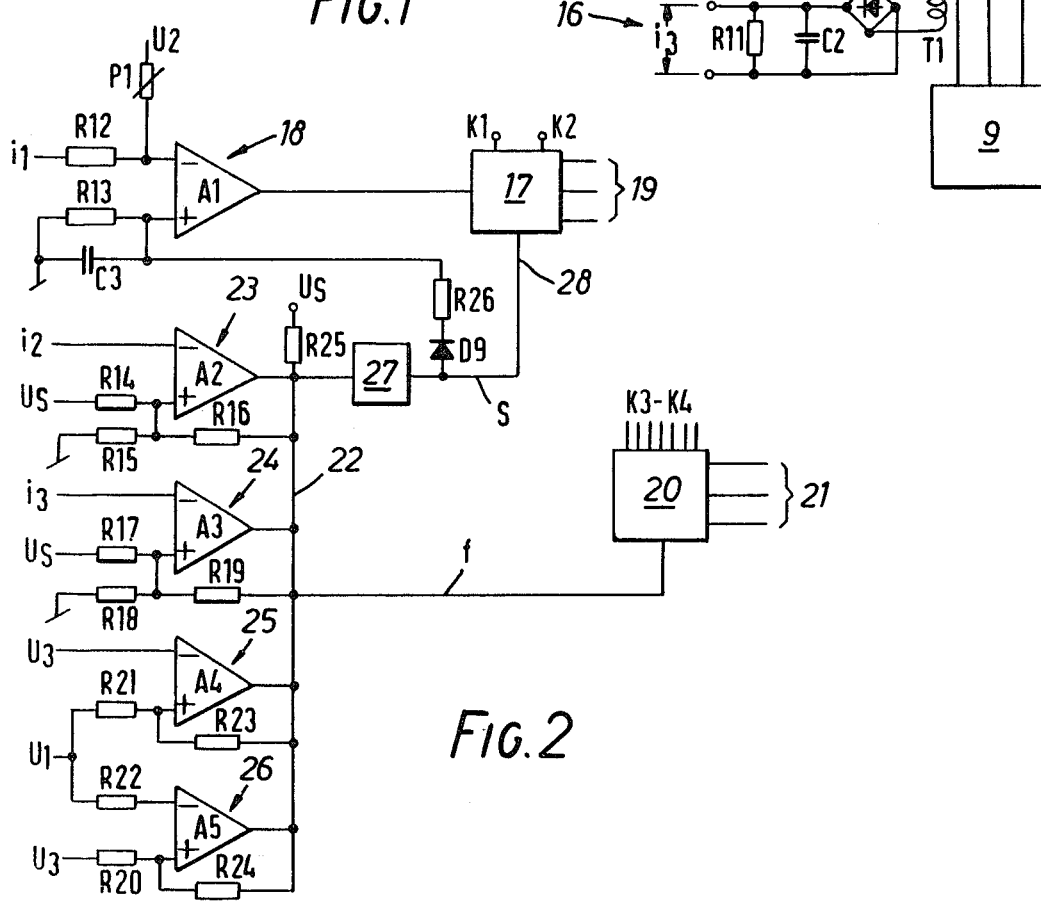
FIG. 2 is a block diagram of the actual protective circuit.

FIG. 2 shows a regulator signal generator 17 of which the outputs correspond to the regulator inputs $k1$ and $k2$. This regulator signal generator is controlled by a current regulator 18 in such a way that the current set at a potentiometer P1 just flows in the intermediate circuit at the voltage $U_r$ that is produced. For this purpose the regulator has a differential amplifier A1 to the inverting input of which the operating current signal $i_1$ is applied by way of a resistor R12 and an operating voltage $u_2$ is applied by way of the potentiometer P1. The non-inverting input is normally also applied to earth by way of a resistor R13. The regulator signal generator can also be influenced by other parameters, as is indicated by the lines 19, for example by the voltage $U_r$, the motor frequency or any other desired values.

To control the transistors Tr2–Tr7 in the inverter 5 there is an inverter signal generator 20 which is fed with input signals by way of at least one line 21, particularly in respect of the desired frequency. Pulses bringing the transistors to the conductive state then occur in the correct phase position and for the correct period at the outputs which correspond to the inputs $k3$ and $k4$ of the transistor Tr2 as well as the inputs of the other transistors.

The outputs of four differential amplifiers A2, A3, A4 and A5 are connected to a common error signal line 22. They are part of an excess current comparator 23, an earth current comparator 24, an undercurrent comparator 25 or an excess current comparator 26. The excess current signal $i_2$ is fed to the excess current comparator A2 at the inverting input. The non-inverting input is fed by the voltage $U_s$ of the control circuit by way of a voltage divider consisting of the resistors R14 and R15. A further resistor R16 serves for positive feedback.

The earth current amplifier A3 is fed at the inverting input by an earth current signal $i_3$ whilst the non-inverting input is again fed with the voltage $U_s$ of the control circuit by way of a voltage divider R17 and R18. A resistor R19 serves for positive feedback.

The inverting input of the under-voltage amplifier A4 is connected directly to a reference voltage $u_3$ and the non-inverting input of the excess voltage amplifier A5 is connected thereto by way of a resistor R20. The voltage signal $u_1$ proportional to the D.C. voltage $U_=$ is connected to the non-inverting input of the under-voltage amplifier A4 by way of a resistor R21 and to the inverting input of the excess voltage amplifier A5 by way of a resistor R22. Both amplifiers have a positive feedback resistor R23 or R24, respectively. The error signal line 22 is connected to the voltage $U_s$ of the control circuit by way of a resistor R25.

If an error signal $f$ occurs in the line 22, the delivery of control pulses to the transistors Tr2 to Tr7 is immediately suppressed in the inverter signal generator so that these transistors are blocked. At the same time a monostable multivibrator 27 is actuated which gives a stop signal $s$ of predetermined duration to a line 28. This stop signal immediately suppresses the delivery of pulses in the regulator signal generator 17 so that the series regulator 3 also remains blocked.

Simultaneously, a condenser C3 in parallel with the resistor R13 at the input of the amplifier A1 is charged by way of a diode D9 and a resistor R26. The voltage at this input is therefore raised by the condenser voltage. It is reduced only gradually on termination of the stop signal $s$ as soon as it permits the discharge by way of the resistor R13.

Figure 3:
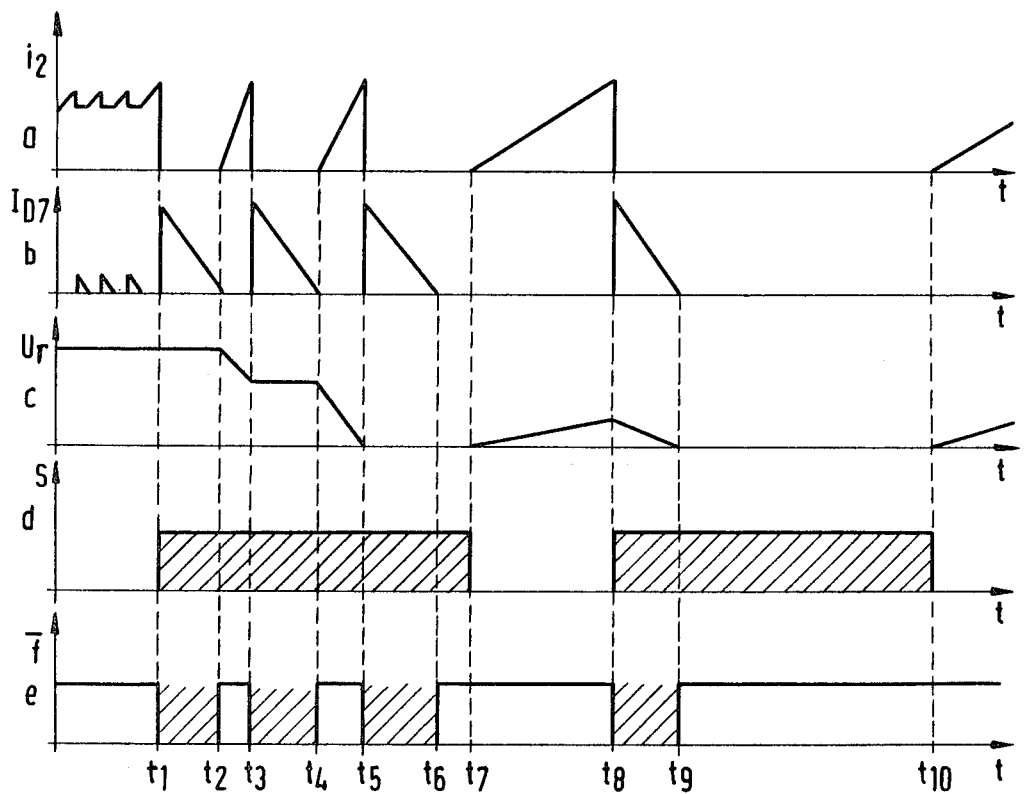
FIG. 3 are various time diagrams showing the conditions during the occurrence of a short circuit, and FIG. 4 are several time diagrams showing the conditions on the occurrence of an earth contact.

To explain the operation, a short circuit will first of all be considered in the load as detected by the excess current measuring location 15. In FIG. 3 there are shown above one another against time the voltage signal $i_2$ for the current flowing through the transistors (line $a$), the current $I_{D7}$ flowing through the rectifier D7 (line $b$), the voltage $U_r$ at the intermediate circuit (line $c$), the stop signal $s$ (line $d$) and the inverted error signal $\bar{f}$ (line $e$).

Prior to the instant $t_1$ the circuit was in normal operation. At the instant $t_1$, the excess current comparator 23 detected the presence of an excess current. The error signal $f$ is produced immediately and the stop signal $s$ is initiated. The choke L2 maintains the current which now flows through the circuit through the diode D7. After a certain time, the current drops to below the lower limiting value in the amplifer A2 with contact hysteresis and the error signal $f$ disappears at the instant $t_2$. The inverter signal generator 20 now operates normally. Consequently the transistors Tr2 to Tr7 are brought to the conductive state in the correct sequence. For this reason the condenser C1 discharges through the transistors and the consumer as well as the choke L2 and the measuring resistor R10. Because of the unductors, the current rises only gradually. At the instant $t_3$, it again attains the limiting value at which the excess current comparator 23 responds. The resulting error signal $f$ again blocks the inverter. The current through the choke L2 is maintained for a while by way of the diode D7. At the instant $t_4$, the excess current amplifier A2 is switched back. The error signal $f$ disappears. The filter condenser C1 can again discharge through the inverter. Since its voltage had already dropped, it this time takes longer before the maximum current value is again reached at the instant $t_5$, whereby the inverter is again blocked. Its conductivity occurs at the instant $t_6$. Since the condenser is fully discharged and the series regulator 3 remains blocked, no disturbing current will now flow. At the end of the stop signal $s$, i.e., at the instant $t_7$, the regulator signal generator 17 can again commence to operate. However, since the D.C. regulator 18 requires only a small current because the condenser C3 has been charged, and, because of the gradual discharge of the condenser C3, this requirement increases considerably more slowly than corresponding to the normal time constant of the inverter, there will be only a gradual increase in the voltage $U_r$. If the short circuit has not yet been eliminated, an excess current will very soon be detected by the amplifier A2, namely at the instant $t_8$. The voltage $U_r$ will amount to only 5 to 10% of the maximum voltage so that the subsequent discharge of the condenser C1 takes place rapidly. It has already finished at the instant $t_9$. A renewed attempt at running up occurs at the end of the stop signal $s$ at the instant $t_{10}$. If there is now no short circuit, the voltage $U_r$ rises to the desired value at the illustrated small inclination.

Figure 4:
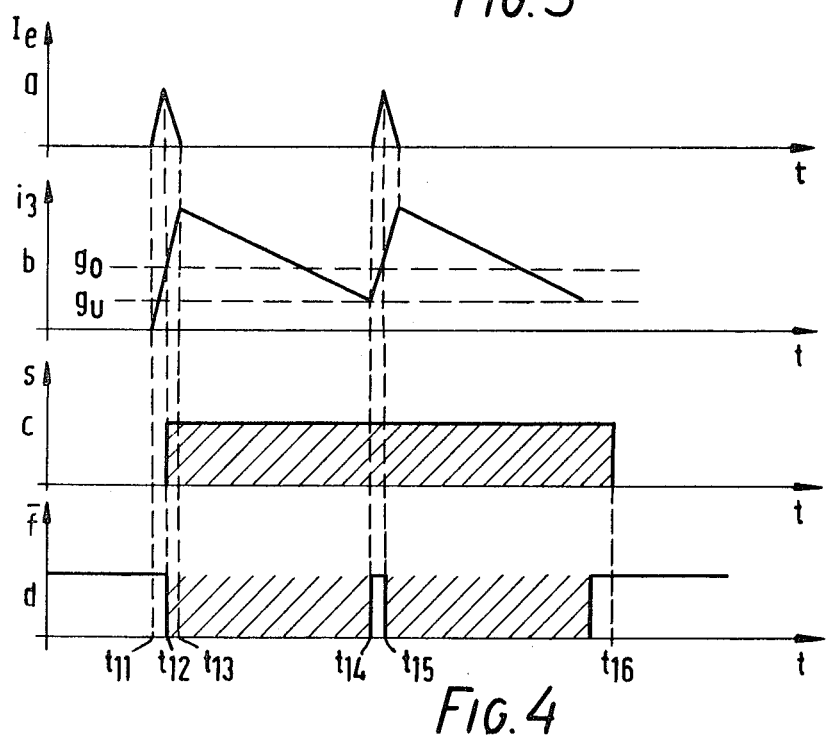

The conditions with an earth current will be considered in conjunction with FIG. 4. Here there are shown over one another the earth current $I_e$ (line $a$), the signal voltage $i_3$ at the condenser C2 (line $b$), the stop signal $s$ (line $c$) and the inverted error signal $\bar{f}$ (line $d$). On the occurrence of an earth current, the summation transformer T1 will respond. From the instant $t_{11}$, the condenser C2 is charged. At the instant $t_{12}$, the signal $i_3$ exceeds the upper limiting value $g_o$ of the earth current amplifier A3 having contact hysteresis. By reason of the occurrence of the error signal $f$ and stop signal $s$, the series regulator 3 and the inverter 5 are blocked. The earth current $I_e$ fades out up to the instant $t_{13}$. The condenser C2 was being charged up to this time. It is subsequently discharged through the resistor R11. As soon as the signal $i_3$ drops below the lower limiting value $g_u$, which occurs at the instant $t_{14}$, the inverter again becomes conductive. The filter condenser C1 can discharge partially in the manner described in relation to the excess current. However, the earth current $I_e$ will again rise simultaneously so that a short time later, namely at the instant $t_{15}$, the amplifier A3 will again give the error signal $f$. The conditions as just described are repeated. When the stop signal $s$ terminates at the instant $t_{16}$ and the earth current has disappeared, normal operation will follow. If the earth current is still present, an error signal $f$ will again be produced to release a stop signal $s$ and repeat the aforementioned procedure.

Should there be any direct current components during the earth connection, they are detected by the excess current measuring location R10.

On the occurrence of an under-voltage, the under-voltage comparator 25 wll give an error signal $f$ until the normal voltage has again been established. The excess voltage comparator 26 gives an error signal $f$ when the input voltage is too high. This ensures that the inverter will operate only when the voltage is held constant within predetermined limits.

I claim:

1. A protective circuit having input and outlet branches for an inverter having semiconductor control elements, comprising, a series regulator in said input branch, an intermediate filter circuit between said regulator and said inverter including a capacitor extending between said branches, a first signal generator for controlling said regulator and a second signal generator for controlling said inverter, a control unit for controlling said first signal generator, a comparator unit having an input connected to a measuring point in said outlet branch for detecting an excessive current condition and an output connected to both of said signal generators, said comparator producing an error output signal while sensing said excessive current condition to effect the immediate turning off of said series regulator and said inverter upon the initiation of said output signal, said inverter being off concurrently with said output signal, switch means having a fixed time period off state disposed between said comparator output and said first signal generator for maintaining said series regulator in an off condition during said fixed time period independently of said output signal, and dissipating means for discharging said capacitor when said series regulator is in an off state and said output signal has terminated.

2. A protective circuit according to claim 1 wherein said switch means is a monostable multivibrator.

3. A protective circuit according to claim 1 including means in said outlet branch for limiting the rate of current increase at said measuring point, said means in said outlet branch including an inductor and resistor means, and a diode in shunt with said last named means poled opposite to normal current flow.

4. A protective circuit according to claim 1 wherein said control unit has an input connected to a second measuring point in said outlet branch downstream from said first named measuring point, said control unit including a starting circuit having a control input connected to the output of said switch means, said starting circuit including delay means for slowing the action of said control unit after said switch turns off.

5. A protective circuit according to claim 4 wherein said control unit includes a differential amplifier and said starting circuit is connected to the noninverting input thereof, a diode and charging resistor connected to the input of said starting circuit, said starting circuit including a capacitor and a resistor in parallel.

6. A protective circuit according to claim 1 including a plurality of additional comparator units in parallel to each other and said first named comparator unit, said additional comparator units being responsive to other circuit parameters.

7. A protective circuit according to claim 1 wherein said dissipating means includes said semiconductor control elements, said second signal generator being operative to operate said semiconductor control elements at the termination of said error output signal independently of said switch means.

8. A protective circuit according to claim 7 wherein said filter circuit has a current measuring location at which said comparator senses excessive current, said comparator having control hysteresis to give said error signal a predetermined duration.

* * * * *